US011299355B2

(12) United States Patent
Raggi et al.

(10) Patent No.: US 11,299,355 B2
(45) Date of Patent: Apr. 12, 2022

(54) APPARATUS AND METHOD FOR THE SELECTIVE SORTING OF GROUPS OF PANELS INTENDED FOR DIFFERENT CUSTOMER ORDERS

(71) Applicant: CEFLA Società Cooperativa, Imola (IT)

(72) Inventors: Gianni Raggi, Imola (IT); Massimo Dovadola, Imola (IT)

(*) Notice: Subject to any disclaimer, the term of this patent is extended or adjusted under 35 U.S.C. 154(b) by 0 days.

(21) Appl. No.: 17/249,682

(22) Filed: Mar. 9, 2021

(65) Prior Publication Data
US 2021/0284466 A1 Sep. 16, 2021

(30) Foreign Application Priority Data

Mar. 13, 2020 (IT) .................. 102020000005407

(51) Int. Cl.
*F26B 15/14* (2006.01)
*B65G 47/64* (2006.01)
*B65G 47/66* (2006.01)
*B65G 47/71* (2006.01)
*F26B 25/00* (2006.01)

(52) U.S. Cl.
CPC ............. *B65G 47/64* (2013.01); *B65G 47/71* (2013.01); *F26B 15/14* (2013.01); *F26B 25/004* (2013.01); *B65G 2201/02* (2013.01)

(58) Field of Classification Search
CPC ........ F26B 25/14; F26B 25/004; B65G 47/64; B65G 47/66; B65G 47/71
USPC .................................................. 198/435, 436
See application file for complete search history.

(56) References Cited

U.S. PATENT DOCUMENTS

| 4,867,299 A | 9/1989 | Fukuoka et al. |
| 7,699,158 B2 | 4/2010 | Aust et al. |
| 8,826,532 B2 * | 9/2014 | Caveney ............. H01R 4/2429 29/857 |

(Continued)

FOREIGN PATENT DOCUMENTS

FR 2190700 2/1974

OTHER PUBLICATIONS

Italian Patent and Trademark Office, Search Report, dated Oct. 30, 2020—Relevant pages are in English.

*Primary Examiner* — Douglas A Hess
(74) *Attorney, Agent, or Firm* — Themis Law

(57) ABSTRACT

A method and system for picking up painted panels of different dimensions and finishes includes inserting the painted panels into a selective sorting system having two superimposed mobile conveyor sectors of a predefined length and with a driving motor for the alternate advancement in one of two directions. The two mobile conveyor sectors move vertically synchronously and are arranged alternately and in series with a fixed conveyor sector. After uploading in the selective sorting system, the painted panels are kept inside the selective sorting system for a time sufficient for drying, and are withdrawn through an upload and download system, which includes software memorizing the position of the uploaded panels, actuating the lifting and/or lowering motors of the mobile conveyor sectors, and advancing the mobile conveyor sectors and the fixed conveyor sector so as to move the panels due for a customer order, temporarily storing undesired panels in a buffer.

13 Claims, 6 Drawing Sheets

(56) References Cited

U.S. PATENT DOCUMENTS

| | | | | |
|---|---|---|---|---|
| 9,022,204 | B2* | 5/2015 | Wang | B65G 47/643 |
| | | | | 198/435 |
| 9,284,127 | B2* | 3/2016 | Heinsohn | B65G 37/02 |
| 9,874,397 | B1* | 1/2018 | Ball, Jr. | F26B 21/022 |
| 9,919,878 | B2* | 3/2018 | Dong | H01L 21/67715 |
| 10,011,439 | B2* | 7/2018 | Sonoura | B65G 15/00 |
| 10,494,177 | B1* | 12/2019 | Cioclei | B65G 1/127 |
| 10,612,848 | B2* | 4/2020 | Dovadola | F26B 15/10 |
| 10,766,714 | B2* | 9/2020 | Itoh | B65G 47/57 |
| 11,000,966 | B2* | 5/2021 | Ishiguro | F26B 15/14 |
| 11,014,766 | B2* | 5/2021 | Hartmann | B65G 21/12 |
| 2019/0127153 | A1 | 5/2019 | Itoh | |

* cited by examiner

APPARATUS AND METHOD FOR THE SELECTIVE SORTING OF GROUPS OF PANELS INTENDED FOR DIFFERENT CUSTOMER ORDERS

FIELD OF THE INVENTION

The present invention relates to an apparatus and a method for preparing an order to be shipped to a customer, provided with a selective sorting of panels, starting from a set of panels coming from a painting line or a storage suitable for completely drying said panels.

In this context, a customer's order means a list comprising a plurality of panels well-defined in terms of kind of finish (e.g., glossy/matt), color, dimensions of every single panel. E.g., an order may comprise a glossy red panel having main dimensions of 400×600 mm, a matt blue panel having dimensions of 500×1200 mm, etc.

BACKGROUND OF THE INVENTION

A mainly flat panel means a panel wherein two of its three dimensions are much wider than its third dimension. Typically, the dimensions of such panels range 100×300×18 mm to 1250×2400×30 mm.

The system according to the present invention allows combining the panels to be painted in production batches according to their color and/or kind of paint (e.g., glossy/matt) to be applied. This in order to reduce the need of color changing of painting machines, and to perform the subsequent panel sorting downstream the drying systems, in a mode which is independent from panel loading.

Panels are normally grouped by "painting batch"; such group can comprise panels that are intended for different customer's orders. The apparatus according to the present invention allows to sort just the panels belonging to a single customer's order, both when the order comprises a plurality of panels, and when these panels are comprised in a customer's order comprising other panels stored in another place of the storage system.

In the art, preparing orders comprising panels provided with different dimensions/finish is known. Generally, the preparation of the orders is performed through a manual withdrawing of the panels, from a stack of panels placed in a finished products warehouse placed downstream the painting machines.

This productive system is based on batch-and-queue production, and generates long lead times; moreover, it requires to produce panels in advance with respect to shipping.

U.S. Pat. No. 7,699,158 B2 to Smiths Helmann GmbH discloses a baggage transport device for the security control of baggage or cargo items, comprising at least one baggage switch with at least two horizontal conveyors which are arranged parallel one above the other at a fixed distance and which can be moved vertically with the help of a lifter.

FR2190700A1 to Elmag SpA describes an apparatus and a method for continuously passing a product from a first processing station to a second processing station in which the product must remain for a predetermined period of time. The apparatus comprises a fixed series of overlapping supports which support product units arranged in the second work station, a mobile series of overlapping supports, in such a number that the number of supports of the fixed series is equal to twice the mobile series minus one, and mounted on a device which is mobile between a first position in which the higher support of the fixed series is aligned with the upper support of the movable series, and a second position in which the lower support of the fixed series is aligned with the lower support of the movable series, a feeding unit of products of the mobile series supports being aligned with the uppermost support when the device is in the second position, each of the supports of the two series including means that allow to move the product units.

All this is antithetic with the most modern techniques for organizing production, based on methods known as Toyota Production System (TPS) or Lean Production or Just in Time (JIT).

Market drivers are: delivery speed and product customization, lead time reduction, reduced dimensions of production batches, developing and producing special pieces. The production for a more modern warehouse as performed up to now is possible just for non-customized product (mass production).

On the other hand, the market requirement is to produce lots size one, with a huge range of finish and dimensions of the panels, and with pull manufacturing.

For mechanical processing the problem was tackled, and now there are provided sundry solutions on the market. For painting, the problem is more complex.

The set-up time of the painting machines, although was reduced to few minutes, inevitably is very expensive due to material waste and to the need of cleaning solvents (in addition to the purchase cost, the disposal cost is to be considered, too).

Therefore, to reduce these costs, the production is scheduled according to daily shipping, grouping the panels to be produced as much as possible according to the kind of paint applied.

Despite these methods, the number of paint changes in a working shift went from about a hundred to several tens.

In order to ensure the long drying times (indicatively 6 hours) required for the finish most appreciated by the market, painting plants work with discontinuous systems (batches comprising 8-12 pieces on average).

Roller conveyors are known, which are used in stacker cranes, used just for transferring panels inside and outside automated storage systems.

These known devices lift the whole set of painted panels, meant as the length of a fraction of the working batch, in this way setting a limit of frequency and in the composition of the customer's order. In other words, the customer's order necessarily comprises all the panels placed in said set.

SUMMARY OF THE INVENTION

Aim of the present invention is providing an apparatus and a method for selectively sorting panels having different finishes, coming from a storage or from drying ovens of a painting line, or directly form a painting line, so as to prepare a customer's order.

This object is achieved by an apparatus and a method having the features of the independent claims. Advantageous embodiments and refinements are specified in claims dependent thereon.

The devices according to the present application allow to overcome the drawbacks of the known solutions.

Object of the present invention is a storage and/or conveying system provided with buffers wherein the panels not making part of the customer's order prepared in that moment are temporarily held.

The known art limit is overcome using a plurality of roller or band conveyors integrated with a lifting device, so that panels can be exchanged from a conveyor to the other, allowing to prepare the customer's order.

In a first embodiment, the composition of a customer's order comprising panels provided with different colors occurs inside a vertical oven/storage exploiting the possibilities of movement provided by roller conveyors mobile along the vertical direction.

The term oven/storage in the present description and/or in the claims indicates an oven which is combined with a storage or which is structured in such a way that it also has storage functions, that is that it allows to store inside it a predetermined quantity of products for a predetermined period of time to keep said products in the confined environment conditioned by the functions of the oven. In other words, the term oven/storage in this document means that the enclosed system housing the selective sorting system according to the present invention can be intended to just store painted panels (storage) or can be intended to dry painted panels (oven) or both store and dry painted panels, the functioning of the selective sorting system being the same.

In a second embodiment, the composition of a customer's order comprising panels with different colors occurs outside a vertical oven/storage, exploiting the possibilities of movement provided by band conveyors mobile along the vertical direction, using the same operating principle used in the vertical over/storage.

It is worth mentioning that with the first embodiment (vertical oven/storage) an active drying of said panels can be performed, i.e., inside said oven/storage there are provided known devices (e.g., IR or UV lamps, heaters), which actively contribute to panels drying. In the second embodiment, which provides the conveying of the painted panels outside a closed space, said painted panels are already dried or spontaneously (passively) dry in the air.

The two embodiments are unified by the same inventive concept, i.e., by the fact that panels that are different in their dimensions, but provided with the same color and finish, which were painted during the same painting operation, are conveyed on a path that aims to prepare a customer's order. Areas that work as buffers remove some panels from the panels advancing toward the end of the path, allowing to temporarily hold the panels which are not intended for that specific customer's order. The panels that are temporarily held in said buffers can then be released from said buffers in order to be inserted again in the path that brings them to make part of a successive customer's order.

A first advantage of the present invention is the possibility of preparing a customer's order in a totally automated way, without manual withdrawing of panels performed by a human operator.

A second advantage is the possibility of conveying even a painted single panel during the preparation of the customer's order.

A third advantage is the possibility of best optimizing the number of color changes during painting, according to production batch.

BRIEF DESCRIPTION OF THE DRAWINGS

Further advantages and properties of the present invention are disclosed in the following description, in which exemplary embodiments of the present invention are explained in detail on the basis of the drawings.

DETAILED DESCRIPTION OF EMBODIMENTS OF THE INVENTION

Figure 1:
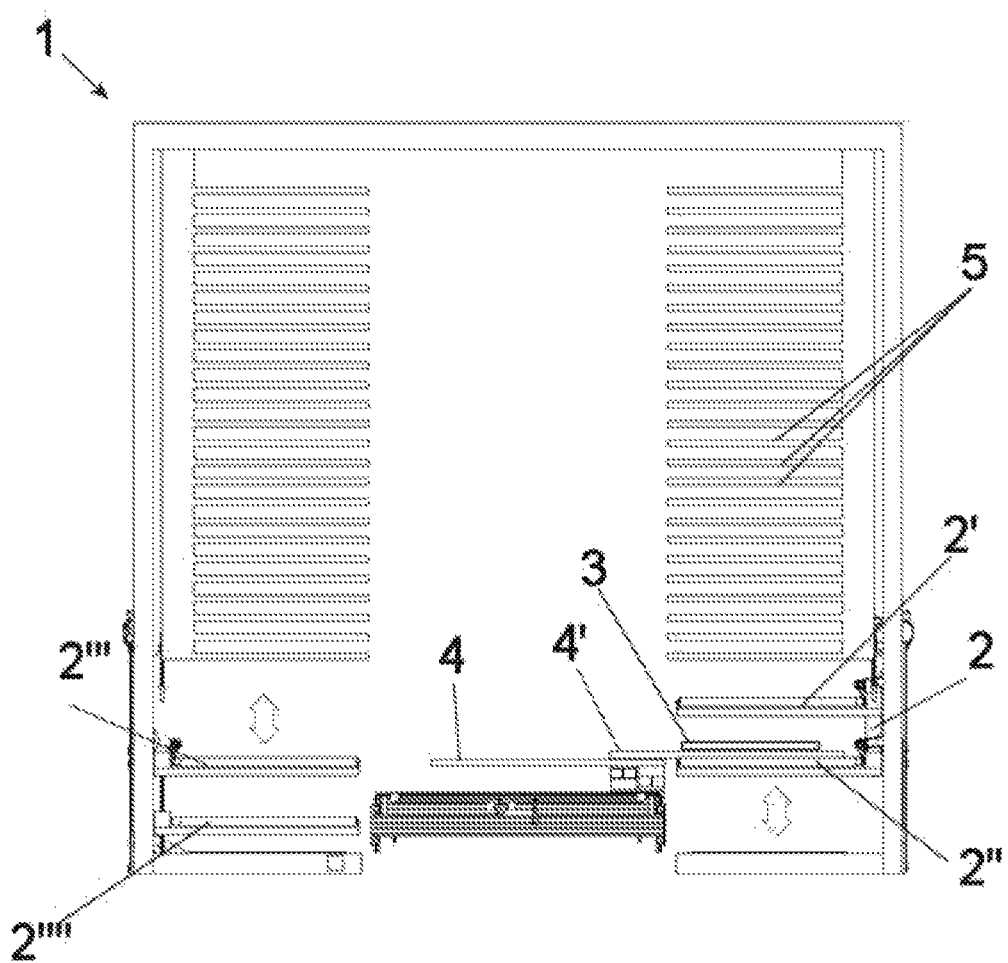
FIG. 1 is a transversal section of a vertical oven/storage according to the first embodiment.
Figure 2:
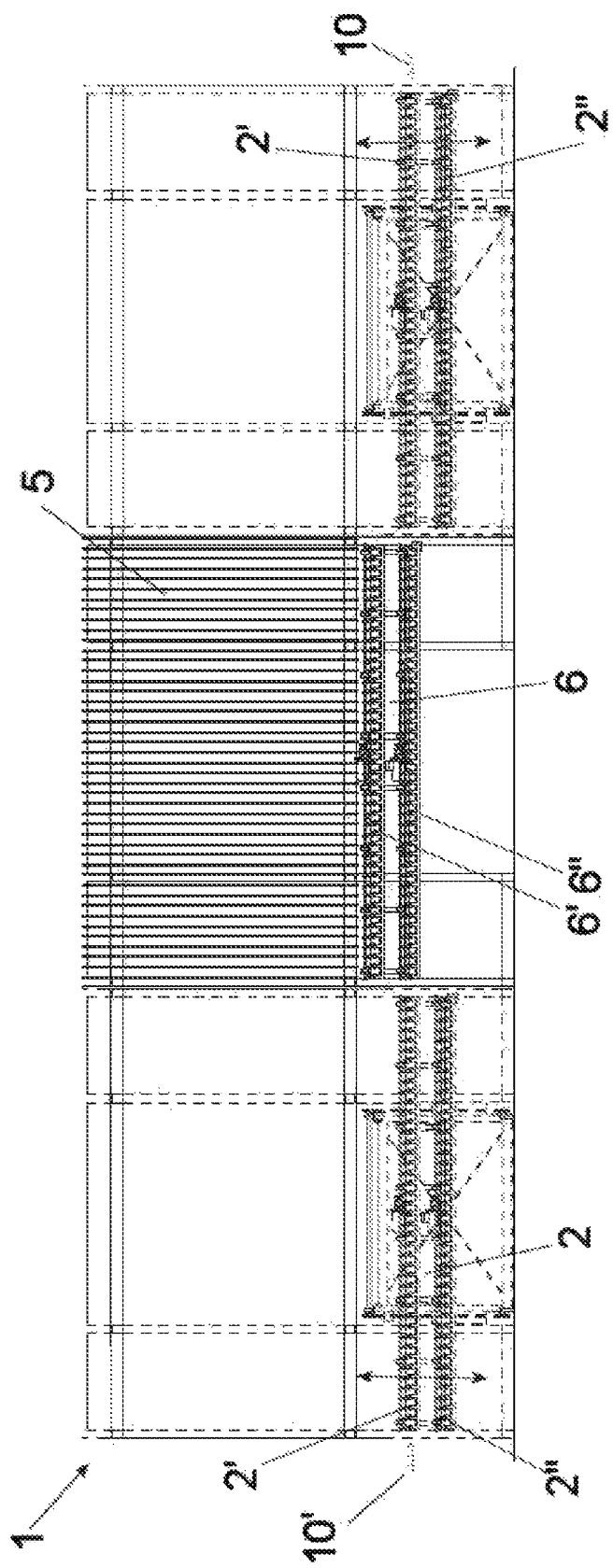
FIG. 2 is a lateral section of the same vertical oven/storage.
Figure 4:
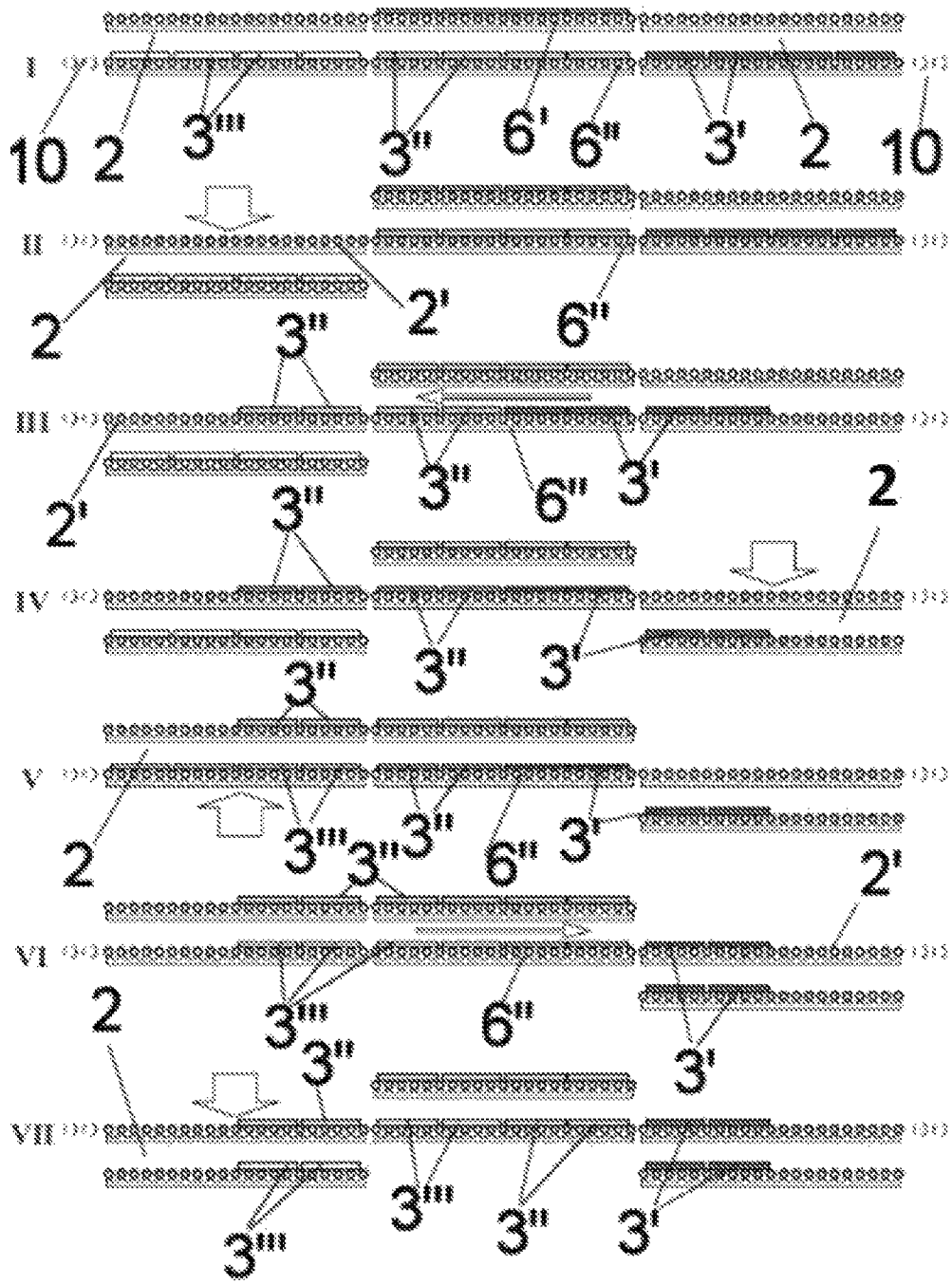
FIG. 4 illustrates a longitudinal section of the vertical oven/storage, sequence of movement of panels.

FIGS. 1, 2 and 4 show the first embodiment of the present invention, wherein the composition of a customer's order occurs inside a vertical oven/storage.

FIG. 1 shows in a transversal section a typical vertical oven/storage 1 for drying painted panels, generally indicated with 3, placed on a plurality of roller conveyors 2', 2'', 2''', 2''''. 2 indicates a block of two overlapping roller conveyors, e.g., 2' e 2'' or 2''' e 2'''', which are integral when moving.

Moreover, FIG. 1 shows a block 4 comprising retractable lateral forks 4, 4', which withdraw/deposit said panels 3 on said roller conveyors 2 and on a plurality of fixed laths 5.

FIG. 2 shows a lateral section of the same vertical oven/storage 1, wherein, in order to simplify the drawing, some of the fixed laths 5 were omitted, while said roller conveyors are visible. Said roller conveyors, arranged in pairs, can be fixed roller conveyors (indicated with 6), or mobile roller conveyors 2, provided with a vertical movement indicated with double arrows. Typically, in the longitudinal direction of said vertical oven/storage, said mobile roller conveyors 2 and fixed roller conveyors 6 are arranged alternated and placed in series. In FIG. 2, the two mobile roller conveyors 2 are shown in the low position indicated with A in FIG. 3.

Figure 3:
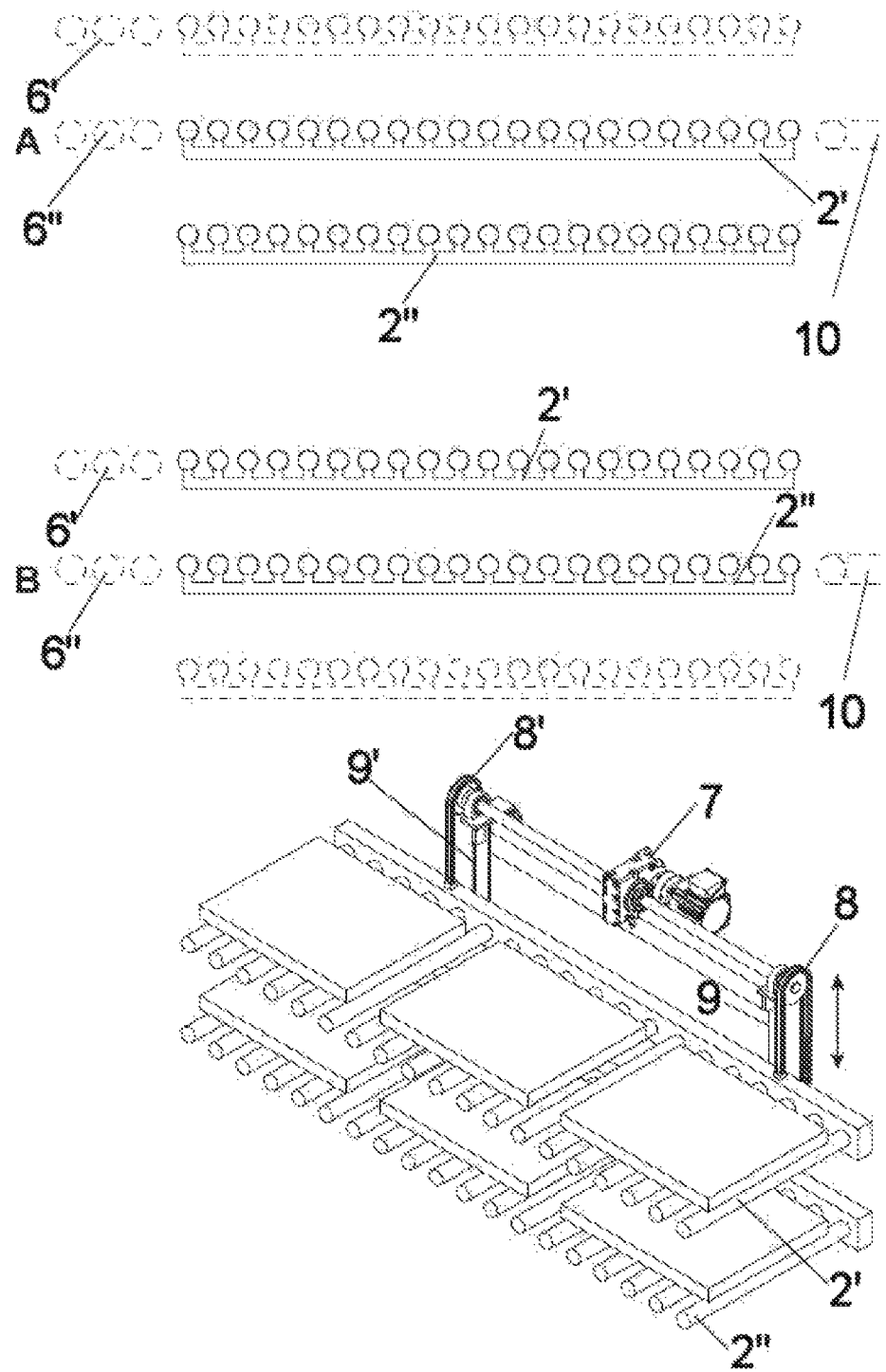
FIG. 3 illustrates a detail in a longitudinal section and axonometric view of a mobile roller conveyor.
Figure 6:
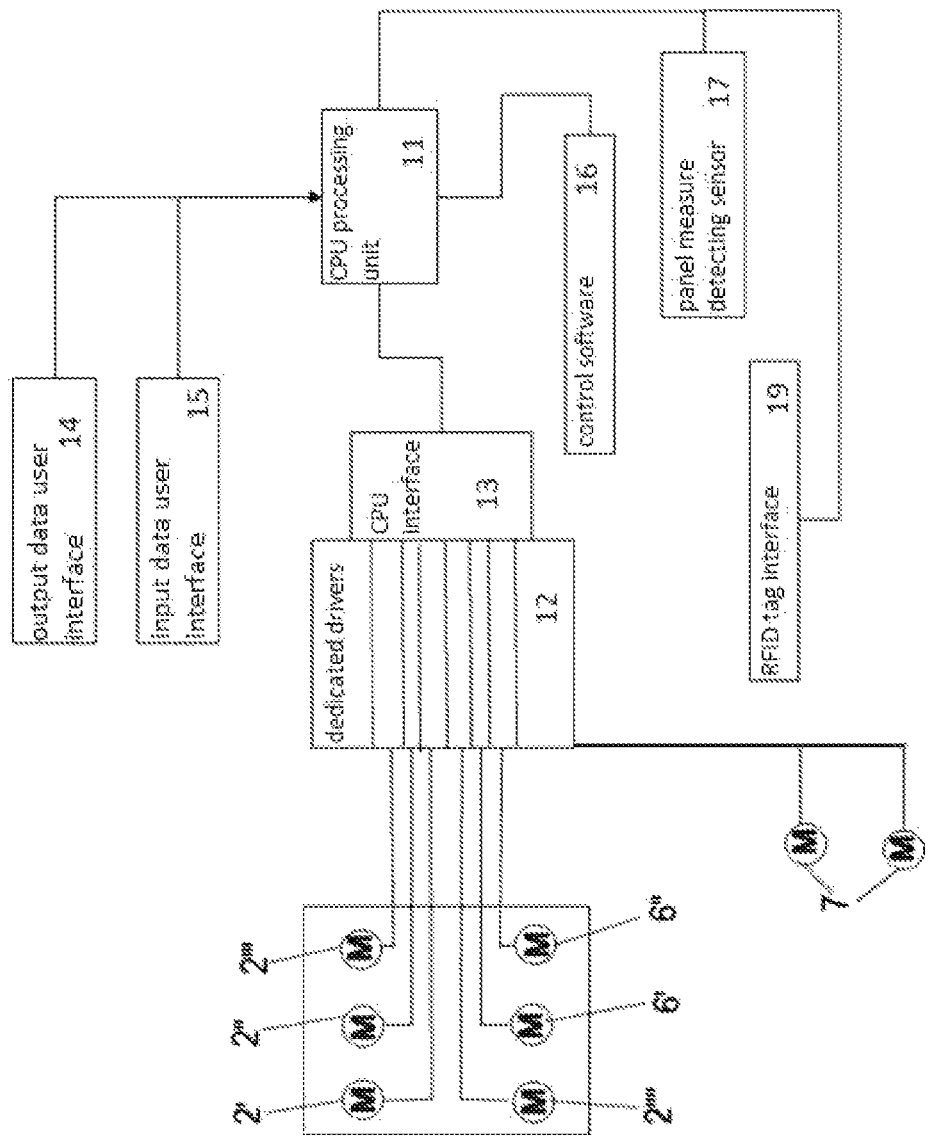
FIG. 6 is a block diagram of an embodiment of the control system of the vertical oven or of the sorting system.

As the operation of the sorting system according to the present invention is the same in both embodiments (the first inside a vertical oven/storage and the second outside an oven/storage), it should be mentioned that FIGS. 3 and 6 show the working of said sorting system indifferently for the first and the second embodiment.

FIG. 3 shows a detail of a group 2 of mobile roller conveyors; at the top they are shown in a longitudinal section, while in the bottom part they are shown in an axonometric view, so as to facilitate the understanding of the text, as some portions of the drawings are better visible in one or the other view.

The group 2 of mobile roller conveyors vertically moves from a position A to a position B and vice versa through a motor group, comprising a motor 7, two lifting chains 8, 8' and two movement guides 9 and 9' in a way known to the skilled person.

In the low position indicated with A, the top roller conveyor 2' is aligned with a panel input/output conveyor 10, while in the high position indicated with B, the bottom roller conveyor 2'' is aligned with said panel input/output conveyor 10. When the vertically mobile group 2 is in the position A, said top roller conveyor 2' is placed at a height from ground corresponding to that of bottom fixed roller conveyor 6''. When the group 2 is in the position B, said top roller conveyor 2' is placed at a height from ground corresponding to that of the top fixed roller conveyor 6'.

FIG. 4 shows a longitudinal section of the sorting method 1 in a sequence showing a movement of painted panels 3. It should be mentioned that said painted panels 3 can be moved indifferently to the right and to the left of the Figure, according to need. A unique advancing direction for panels is not provided. Apparently, both fixed roller conveyors 6, and mobile rollers conveyor 2 are motorized roller conveyors that allow the movement of painted panels 3 in both driving directions.

FIG. 4 shows two mobile roller conveyors 2 (a first placed on the left and a second placed on the right of the Figure), wherein a fixed roller conveyor 6 is placed between them. Said fixed roller conveyor 6 comprises two roller conveyors, a first top roller conveyor 6' and a second bottom roller conveyor 6".

To make a non-limiting example, in FIG. 4 red panels are indicated with on 3', pale blue panels with 3", white panels with 3'''.

The movement sequence of the panels 3 comprises e.g., the following steps:

I. The first group 2 of mobile roller conveyors placed on the left in its high position is shown in the condition which allows to convey a plurality of panels 3' from the input position 10;

II. The first group 2 of mobile roller conveyors is lowered, so that the free roller conveyor 2' is brought at the same height of fixed roller conveyor 6";

III. Said system can longitudinally advance said panels 3' and 3" placed on the right, so as to load a plurality of panels 3" on said free lowered mobile roller conveyor 2' of the first group; a part of said panels 3" ends up on the first group 2 of mobile roller conveyors, while a part of panels 3' ends up on the fixed roller conveyor 6";

IV. The second group 2 of roller conveyors on the right is lowered, bringing the panels 3' toward the ground, while the second group of mobile roller conveyors 2 brings said fixed roller conveyor 2' in a position aligned with the fixed roller conveyor 6";

V. The first group 2 of mobile roller conveyors is vertically lifted so as to bring the panels 3''' at the same level of the fixed roller conveyor 6", allowing the panels to advance in the opposed direction;

VI. Said panels 3' are brought from the fixed roller conveyor 6" to the roller conveyor 2' of the second group 2 of mobile roller conveyor; a portion of panels 3''' is moved to the fixed roller conveyor 6";

VII. The first group 2 of mobile roller conveyors is lowered, and in this way all the three finishes of panels 3', 3", 3''' e 3" are aligned at the same height of the input/output 10 plane. This set of panels 3', 3", 3''' and 3" can be conveyed out of said vertical oven/storage 1 through the output 10 to prepare a customer's order.

Figure 5:
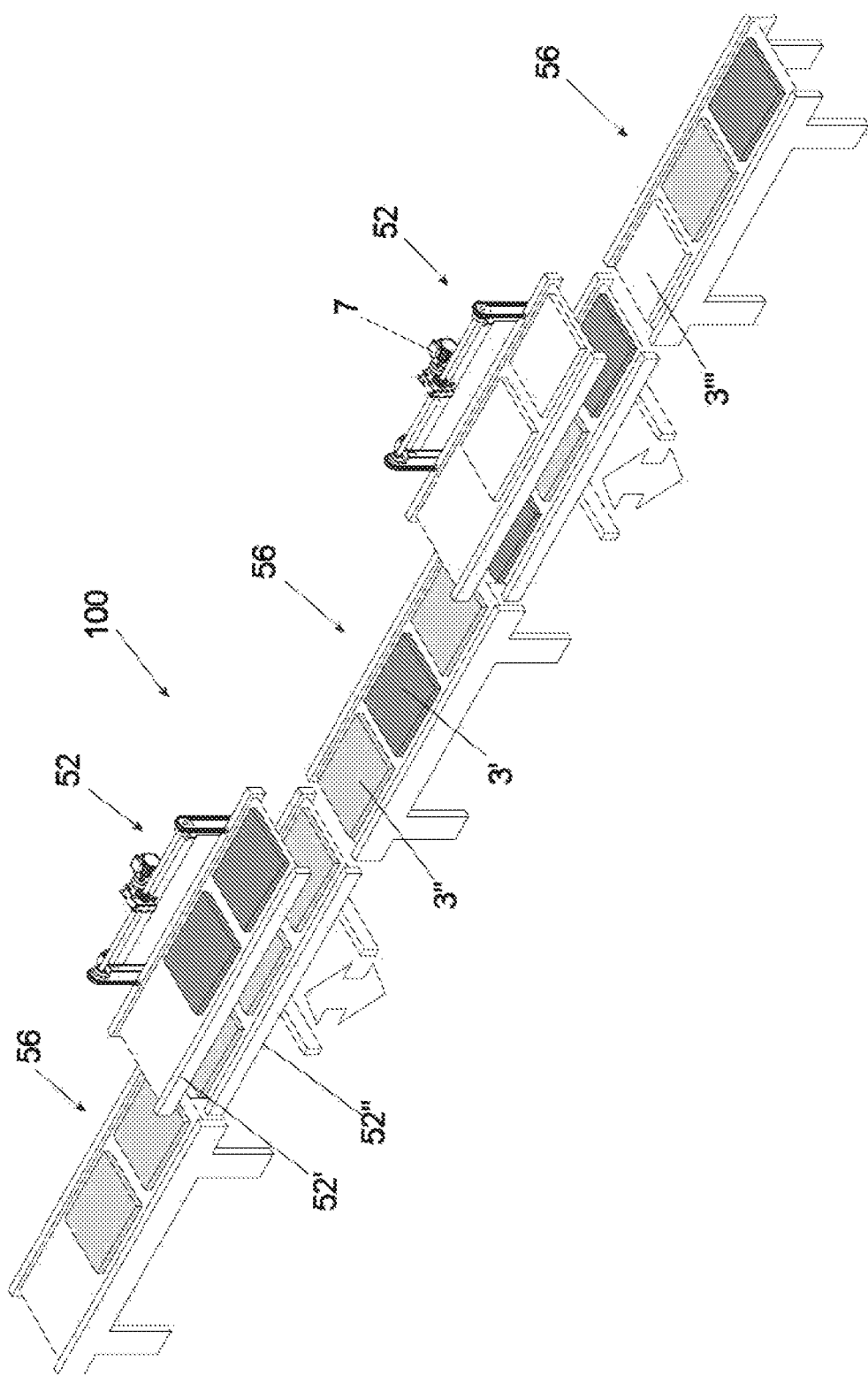
FIG. 5 is an axonometric view of a sorting system according to the second embodiment.

FIG. 5 shows the second embodiment in the form of a selective sorting system 100 for panels, wherein the preparation of a customer's order comprising panels having different colors occurs outside a vertical oven/storage 1, using the same principles and kinds of movement of the first embodiment 1. The working of the conveying system remains substantially the same explained in the moving sequence shown in FIG. 4.

In the second embodiment of the sorting system 100, the groups 2 of mobile rollers are replaced with groups 52 of mobile band conveyors. Said band conveyors are well known in the art, and typically comprise a band rotating around a motorized roller and an idle roller.

Each group 52 of band conveyors is provided with a top band conveyor 52' and a bottom band conveyor 52". Fixed band conveyors 56 replace the groups 6 of fixed roller conveyors. Said groups 52 of mobile band conveyors and groups 56 of fixed band conveyors are arranged alternated, placed in series. Said mobile band conveyor groups are provided with a vertical lifting/lowering movement indicated with the white double arrow. The vertical movement brings alternatively said mobile band conveyor 52' or said mobile 52" band conveyor in correspondence to said fixed band conveyor 56, so allowing the passage of panels 3 from a group 52 of mobile band conveyors to a fixed band conveyor 56 or vice versa.

The group 52 of mobile band conveyors moves vertically from the position A to the position B and vice versa through a motor 7, two lifting chains and two movement guides in a way known for a skilled person.

Substantially, the mobile band conveyors 52' work as buffers, which allows to temporarily remove some panels 3 from panel circulation, said removed panels being not requested for a given customer's order. Said panels 3 can successively be re-inserted in panel circulation for the preparation of a following customer's order, bringing said mobile band conveyor 52' at the same height of fixed band conveyor 56, so as to allow the conveying of removed panels 3.

FIG. 6 shows a block diagram of an embodiment of the control system of the vertical oven according to the present invention. The blocks of mobile roller conveyor 2, the blocks of fixed roller conveyor 6 and the lifting motors 7 are schematically shown. The blocks of mobile roller conveyor 2 or the groups of mobile band conveyors 52, the blocks of fixed roller conveyor 6 or the groups of fixed band conveyors 56, and the lifting motors 7 are each independently controlled by a dedicated driver 12, which communicates with a control unit (CPU) 11 through an interface 13, selectively connecting each driver to said control unit 11. The commands that can be provided to the various motors consist in activating the rotation in a direction or in the opposed direction for the mobile roller conveyors 2 and the fixed roller conveyors 6 or for the motorized rollers moving the band of groups 52 and 56 for the horizontal movement of panels 3, and in the vertical lifting or lowering movement for motors 7, allowing the vertical movement of the mobile roller conveyors 2 or of the mobile band conveyors 52.

The control unit is a processing unit, e.g., in the generic form of a PLC or a PC, and executes a control software 16 memorized in a memory area. The control unit 11 is further connected to a man-machine interface comprising at least an output interface, from the machine to the human user, indicated with 14, and at least an input interface, from the human user to the machine, indicated with 15. Thanks to these two interfaces, a human user can manually input the identifying data of a panel or a group of panels and the corresponding dimensions needed to control the mobile roller conveyors 2 or mobile band conveyors 52 according to the dimensions of the panel.

The output interface 14 provides a feedback on the data input by the user with the input interface 15 and/or shows system notifications to the user.

In alternative or in combination to what is provided in the embodiment of the FIG. 6 example, the control unit 11 can be connected to at least a sensor or a detecting system, indicated with 17, of the features of each panel 3, at least of the dimensions (width and length) of the panel.

In an embodiment, said detecting system 17 can provide a combination of a photocell and an encoder allowing to measure the length of the panel when said panel is passing in front of said photocell.

Analogously, in alternative or in combination, there can be provided a communication interface 19 for a RFID tag or another kind of tag associated to the panel, wherein the information relating to the kind of panel and/or finish of the panel and/or the dimensions (at least width and length and/or height) are stored.

Thanks to the programmable control system of which FIG. 6 shows a non-limitative embodiment, the vertical oven/storage 1 or the selective sorting system 100 can perform several functions. In particular the functions relating to the selective actuation of the mobile roller conveyor 2 or mobile band conveyors 52, which are selected according to the dimensions of each single panel when they are withdrawn from said roller or band conveyors.

Many variant embodiments are possible, and they have to be considered part of the routine choices of the skilled person while designing a project.

The control system of the above-described two embodiments 1, 100 allows also to integrate them in a wider and more complex production plant, comprising also other productive units, each intended for a different processing. A particular embodiment can provide a totally automated production line, which entails the human intervention in the step of uploading the panels in a warehouse from which they are automatically withdrawn for a further processing. In this case, the management of the whole plant is assigned to a central control unit, to which the control unit of each machine or processing/conveying line refers. In this case, the panels associated with a customer order are stored in a centralized warehouse from which said panels are transferred to the production line to one or more processing unit.

The features of the single panels, in particular their dimensions, can be manually input by a human user, or through an automated detecting system 17 as described above, just for the control unit of the vertical oven/storage or the selective sorting system. From here the plant becomes completely automatic, and withdrawing the panels composing a customer order from a pre-set storing unit, allows to univocally access to information relating to panel dimensions, and to transmit these features to one or more of the processing units comprised in the production line, and in particular to the control unit of the vertical oven/storage or of the selective sorting system.

LISTING OF REFERENCE NUMBERS 1 vertical oven/storage
2 mobile roller conveyor
3 panel
4 retractable lateral forks
5 fixed laths
6 fixed roller conveyor
7 motor
8 lifting chain
9 movement guide
10 input/output
11 processing unit of the control unit
12 driver dedicated for the single independent actuators for each single fork
13 interface
14 user interface for input
15 user interface for output
16 memory for the control software
17 automated panel dimensions sensor
18 interface for RFID tag or similar
52 mobile band conveyor
56 fixed band conveyor
100 sorting system

The invention claimed is:

1. A method of picking up painted panels of different dimensions and finishing, the painted panels being inserted in a selective sorting system comprising,
   a group of two mobile conveyor sectors, which are superimposed one over the other, the group comprising an upper mobile conveyor sector having a first predefined length and a lower mobile conveyor sector having a second predefined length, the two mobile conveyor sectors being provided with a driving motor causing an advancement alternatively according to one of two directions, each mobile conveyor sector further moving together in a synchronized manner and causing a vertical upward and downward displacement of the group of two mobile conveyor sectors; and
   a fixed conveyor sector,
   wherein the group of two mobile conveyor sectors and the fixed conveyor sector are arranged alternately and in series;
   the method comprising:
   (a) uploading the painted panels in the selective sorting system;
   (b) keeping the painted panels inside the selective sorting system for a time sufficient to dry or to complete drying; and
   (c) withdrawing the painted panels through an upload and download system to fulfill a customer order;
   wherein the upload and download system is provided with software configured for:
   memorizing a position of the uploaded painted panels; and
   actuating lifting and lowering motors of the two mobile conveyor sectors and the motors for the advancement of the two mobile conveyor sectors and of the fixed conveyor sector, so as to move one or more of the painted panels required to fulfill the customer order, temporarily storing undesired painted panels in a buffer formed by the two mobile conveyor sectors,
   wherein each motor for each of the two mobile conveyor sectors and each motor of the fixed conveyor sector are actuated independently.

2. A method of sorting of painted panels of different dimensions and finishing,
   wherein the painted panels are partially dried and stored in a vertical oven combined with storage function and having a group of mobile conveyor sectors and a fixed conveyor sector,
   wherein the group of mobile conveyor sectors comprises an upper mobile conveyor sector having a first predefined length and a lower mobile conveyor sector having a second predefined length, the mobile conveyor sectors being provided with a first motor for advancement alternatively in one of two directions, the mobile sectors being adapted to move together in a synchronized manner due to a second motor and to perform a vertical displacement lifting and lowering the group of mobile conveyor sectors,
   wherein the group of mobile conveyor sectors and the fixed conveyor sector are arranged alternately and in series, and
   wherein the group of mobile conveyor sectors and the fixed conveyor sector comprise roller conveyors,
   the method comprising:
   (a) uploading the painted panels inside of the vertical oven combined with the storage function;
   (b) keeping the painted panels inside the vertical oven for a time sufficient for drying or for completing drying; and
   (c) withdrawing the painted panels using an uploading and/or downloading system (10) for preparing a customer order;
   wherein there is provided with software configured for:
   memorizing a position of the uploaded painted panels; and actuating the second motor of the mobile conveyors sectors lifting and lowering the mobile conveyor sectors and the first motor driving a rotation of the group of mobile conveyor sectors and the fixed roller conveyor sector correspondingly to one or more of the painted panels to be withdrawn, wherein each motor lifting and lowering each group of the mobile conveyor sectors and each motor driving a rotation of each group of the mobile conveyor sectors and of the fixed roller conveyor sector is actuated independently.

3. The method according to claim 2, wherein a position of each painted panel is uniquely associated to information about features of the painted panel, or to information about one or more of length and width of the painted panel and about kind of painting or coating of the painted panel.

4. A selective sorting system that actively or passively dries and temporarily stores painted panels, comprising:
a group of overlapping mobile conveyor sectors, the group comprising an upper conveyor sector of a first predefined length and a bottom conveyor sector of a second predefined length, the mobile conveyor sectors moving together synchronously due to a motor configured to vertically lift and lower the group;
a fixed conveyor sector, the group of mobile conveyor sectors and the fixed conveyor sector being arranged alternately and in series;
a control unit configured to control an uploading and downloading system of one or more of the painted panels, the group of mobile conveyor sectors, or the fixed conveyor sector, the control unit executing a control software comprising instructions for controlling the uploading and downloading system;
an independent motor for a vertical movement of each group of mobile conveyor sectors, each independent motor being separately controlled by the control unit;
a displacement unit of the group of mobile conveyor sectors and of the fixed conveyor sector which moves horizontally, alternatively the mobile and fixed conveyors sectors along driving directions;
the control software comprising instructions for an independent control of each group of mobile conveyor sectors and of the fixed conveyor sector;
the software comprising instructions configuring the control unit to enable:
each group of mobile conveyor sectors and of each fixed conveyor sector to move the painted panels horizontally; and
each group of mobile conveyor sectors to move vertically, thereby moving the painted panels vertically.

5. The selective sorting system according to claim 4, wherein selective sorting occurs outside a vertical oven adapted to provide storage, without an active drying of the painted panels.

6. The selective sorting system according to claim 4, wherein the mobile and fixed conveyor sectors are closed band conveyors.

7. The selective sorting system according to claim 4, further comprising an oven adapted to provide storage functions, wherein the selective storing system is integrated in the oven for an active drying and temporary storage of the painted panels.

8. The selective sorting system according to claim 7, wherein the mobile and fixed conveyor sectors are roller conveyors, the fixed conveyor comprising a top fixed conveyor and a bottom fixed conveyor.

9. The selective sorting system according to claim 7, wherein selective sorting occurs inside a tunnel configured to perform an active drying of the painted panels according to parameters input in the control unit.

10. The selective sorting system according to claim 7, wherein the group of mobile conveyor sectors moves vertically, bringing the group to one of two alternative positions:
in a first position, a top mobile conveyor sector is aligned with a panel uploading and downloading conveyor, and the top mobile conveyor sector is placed at a height from a ground corresponding to a height of a bottom fixed conveyor sector, and
in the second position, a bottom mobile conveyor is aligned with the panel uploading and downloading conveyor and the top mobile conveyor sector is placed at a height from ground corresponding to a height of a top fixed conveyor sector.

11. The selective sorting system according to claim 7, wherein the painted panels are identified in two alternative ways:
the painted panels are identified through a barcode or RFID tag, in combination with a barcode reader or a RFID tag reader, connected to the control unit; or
the painted panels do not carry any identifier, and identification of the painted panels is performed alternatively or in combination:
through information about panel features provided by a human operator through a man-machine interface connected to the control unit, or
through information on panel features acquired by the control unit of the oven or of the selective sorting system, which are correlated to a location of the painted panels in the oven or in the selective sorting system, which has been determined when uploading the painted panels into the oven or in the selective sorting system,
wherein the control software is interfaced with a managing system of the oven or of the selective sorting system.

12. The selective sorting system according to claim 7, wherein the selective sorting system is part of a production line which comprises at least an additional panel processing machine, and a managing system which processes orders of the painted panels, the managing system comprising an order control unit executing an order control software and generating a database, in which the painted panels are identified through dimensions thereof, or positions thereof in the oven or in the sorting system, the order managing system being connected to a control unit of the oven or to the control unit of the sorting system for transmitting information about types or features of the panels painted acquired when uploading the painted panels into the oven or into the sorting system.

13. The selective sorting system according to claim 4, further comprising a sensor detecting dimensions of the painted panels, the sensor being connected to the control unit.

* * * * *